United States Patent
Yamakage et al.

(10) Patent No.: US 8,295,142 B2
(45) Date of Patent: Oct. 23, 2012

(54) OBJECTIVE LENS FOR RECORDING HOLOGRAM AND HOLOGRAM RECORDING DEVICE

(75) Inventors: Yuzuru Yamakage, Kawasaki (JP); Kazushi Uno, Kawasaki (JP); Yasumasa Iwamura, Kawasaki (JP); Hiroyasu Yoshikawa, Kawasaki (JP); Koichi Tezuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 304 days.

(21) Appl. No.: 12/763,792

(22) Filed: Apr. 20, 2010

(65) Prior Publication Data

US 2010/0202271 A1 Aug. 12, 2010

Related U.S. Application Data

(63) Continuation of application No. PCT/JP2007/070593, filed on Oct. 23, 2007.

(51) Int. Cl.
*G11B 7/00* (2006.01)
(52) U.S. Cl. .......................................... 369/103; 359/19
(58) Field of Classification Search .................. 369/103; 359/19, 30, 364
See application file for complete search history.

(56) References Cited

U.S. PATENT DOCUMENTS

| | | | |
|---|---|---|---|
| 6,205,106 B1 | 3/2001 | Toth | |
| 7,525,706 B2 | 4/2009 | Knittel | |
| 2008/0025185 A1* | 1/2008 | Someno et al. | 369/103 |
| 2008/0117788 A1 | 5/2008 | Kasazumi et al. | |
| 2008/0130463 A1* | 6/2008 | Shimizu et al. | 369/112.01 |

FOREIGN PATENT DOCUMENTS

| | | |
|---|---|---|
| JP | 11-512209 | 10/1999 |
| JP | 2006-113296 | 4/2006 |
| JP | 2006-235226 | 9/2006 |
| JP | 2006-260752 | 9/2006 |
| WO | WO 2006/093196 A1 | 9/2006 |

* cited by examiner

*Primary Examiner* — Wayne Young
*Assistant Examiner* — Brenda Bernardi
(74) *Attorney, Agent, or Firm* — Greer, Burns & Crain, Ltd

(57) ABSTRACT

Provided is an objective lens for recording a hologram that condenses an recording beam on a hologram recording medium, and the objective lens is configured so as to condense, in the case where the recording beam is incident upon the objective lens in a form of a parallel beam flux, an on-axis beam flux and an off-axis beam flux contained in the parallel flux so as to form a beam waist in the hologram recording medium, and such that a distance between an off-axis image point of the off-axis beam flux that defines a largest field angle among the off-axis beam fluxes gradually converging ahead of the beam waist and the hologram recording medium becomes minimal.

4 Claims, 7 Drawing Sheets

OBJECTIVE LENS FOR RECORDING HOLOGRAM AND HOLOGRAM RECORDING DEVICE

TECHNICAL FIELD

The present invention relates to an objective lens for recording a hologram to be used in a recording medium, and a hologram recording apparatus that includes the objective lens.

BACKGROUND ART

Hologram recording apparatuses so far developed include the one disclosed in patent document 1 below. The hologram recording apparatus according to this document records and reproduces the hologram on and from a hologram recording medium, based on what is known as a coaxial system. The hologram recording apparatus is configured so as to emit a reference beam and an recording beam (signal beam) to the hologram recording medium through a same objective lens in the recording process, and to receive a reconstruction beam through a condenser lens located opposite to the objective lens, in the reproducing process.

As illustrated in FIG. 6, an objective lens 700 is normally configured so as to form a telecentric system. The telecentric system is an optical system in which either an entrance pupil or an exit pupil is assumed to be at infinite distance, so that a beam flux is barely converged and runs maintaining a generally constant diameter. A condenser lens which is not illustrated also forms the telecentric system like the objective lens 700. In the case where, for example, a spatial light modulator 500 is located at a position corresponding to the exit pupil; an entrance diameter of an on-axis beam flux S1 and an off-axis beam flux S2 at an entrance surface of the objective lens 700 is denoted by D; and a diameter of a beam waist C formed by the on-axis beam flux S1 and the off-axis beam flux S2 at a position corresponding to the entrance pupil is denoted by d, the entrance diameter D becomes equal to the diameter d of the beam waist C, in the telecentric system. The diameter d of the beam waist C (entrance diameter D of the on-axis beam flux and the off-axis beam flux) can be expressed as $d=2F \cdot NA$, wherein NA represents the object-side numerical aperture, and F the focal length. The smaller the diameter d of the beam waist C is, the smaller a unit area for recording the hologram can be made. Accordingly, a hologram recording medium B is located at the position of the entrance pupil, where the beam waist C is formed (Ref. FIG. 7).

Patent Document 1: Japanese Laid-open Patent Publication No. 2006-113296

However as illustrated in FIG. 7, with reference to the off-axis beam fluxes S2, S3 of different field angles, when the off-axis beam fluxes S2, S3 reach a recording layer B2 through a cover layer B1 of the hologram recording medium B, the off-axis beam fluxes S2, S3 define different angles with respect to an optical axis Lx according to the refractive index of the cover layer B1, and hence on-axis focal points L2p, L3p, at the respective intersection of the principal ray L2, L3 of the off-axis beam fluxes S2, S3 and the optical axis Lx, are shifted from each other. In this case, the beam waist C formed in the hologram recording medium B is expanded, resulting in the drawback that the unit area for recording the hologram cannot be made sufficiently small.

DISCLOSURE OF THE INVENTION

The present invention has been proposed under the foregoing situation. An object of the present invention is to provide an objective lens for recording a hologram capable of significantly slimming the beam waist thereby reducing the size of a unit area for hologram recording, and thus increasing recording density of the hologram, as well as a hologram recording apparatus with such objective lens.

To achieve the foregoing object, the present invention takes the following technical measures.

A first aspect of the present invention provides an objective lens for recording a hologram that condenses an recording beam on a hologram recording medium, wherein the objective lens is configured to condense, upon receipt of the recording beam in a form of a parallel beam flux, an on-axis beam flux and an off-axis beam flux contained in the parallel beam flux so as to form a beam waist in the hologram recording medium, and such that a distance between the hologram recording medium and an off-axis image point of a portion of the off-axis beam flux that defines a largest field angle, among all portions of the off-axis beam flux gradually converging ahead of the beam waist, becomes minimal.

Preferably, the objective lens includes a first lens on an entrance side of the recording beam and a second lens on an exit side thereof, combined as a set.

A second aspect of the present invention provides a hologram recording apparatus that includes an objective lens for recording a hologram that condenses an recording beam on a hologram recording medium, wherein the objective lens is configured to condense, upon receipt of the recording beam in a form of a parallel beam flux, an on-axis beam flux and an off-axis beam flux contained in the parallel beam flux so as to form a beam waist in the hologram recording medium, and such that a distance between the hologram recording medium and an off-axis image point of a portion of the off-axis beam flux that defines a largest field angle, among all portions of the off-axis beam flux gradually converging ahead of the beam waist, becomes minimal.

Preferably, the hologram recording apparatus includes a recording reference beam emitter that emits a recording reference beam so as to cause interference with the beam waist of the recording beam, when emitting the recording beam to the hologram recording medium through the objective lens, a reconstructing reference beam emitter that emits a reconstructing reference beam, being a phase-conjugate beam with respect to the recording reference beam, to the hologram recording medium, and a reconstruction beam receiver that receives through the objective lens a reconstruction beam from the hologram recording medium, generated in an opposite direction to the recording beam by the emission of the reconstructing reference beam.

BEST MODE FOR CARRYING OUT THE INVENTION

Figure 1:
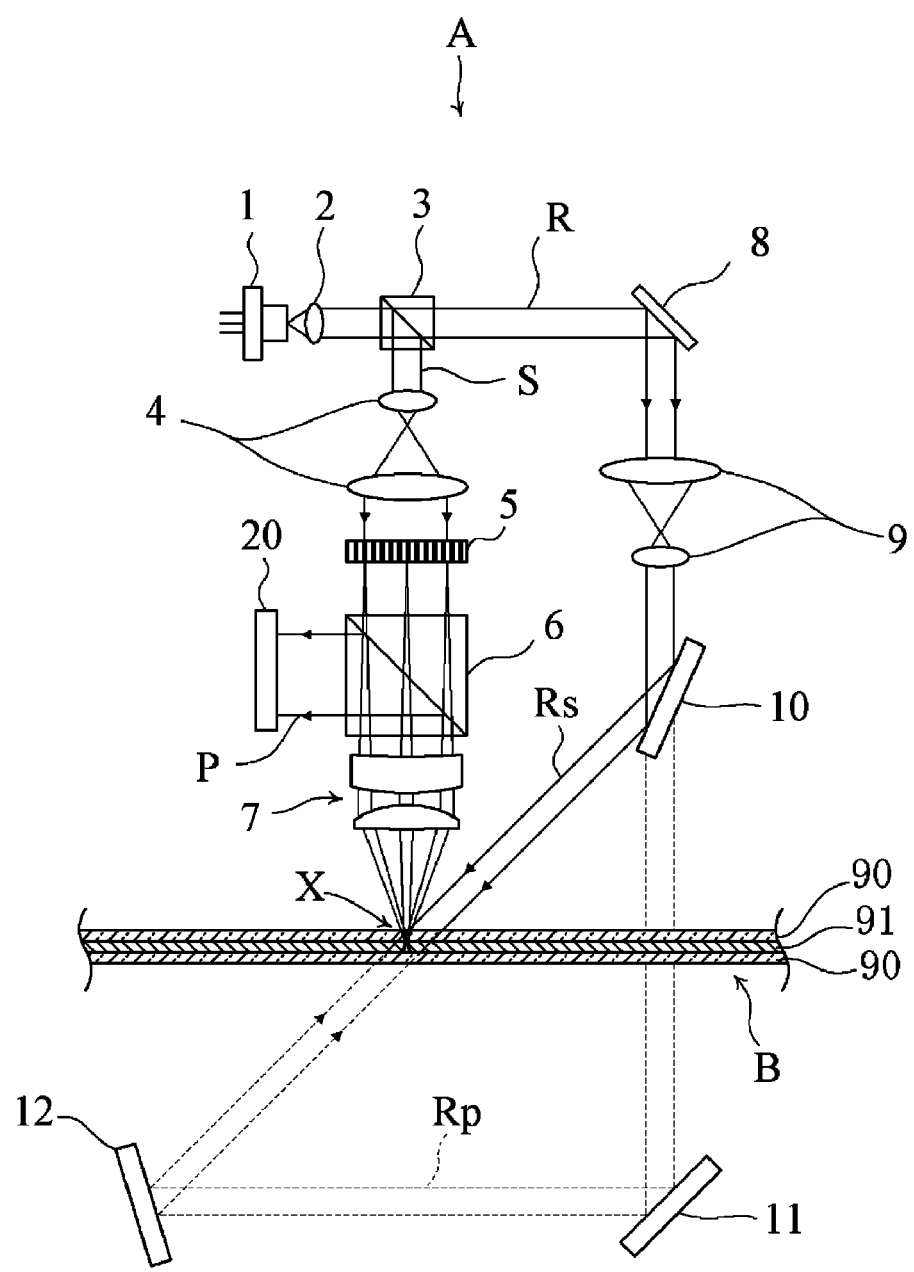
FIG. 1 is a schematic diagram illustrating an overall structure of a hologram recording apparatus according to an embodiment of the present invention.
Figure 2:
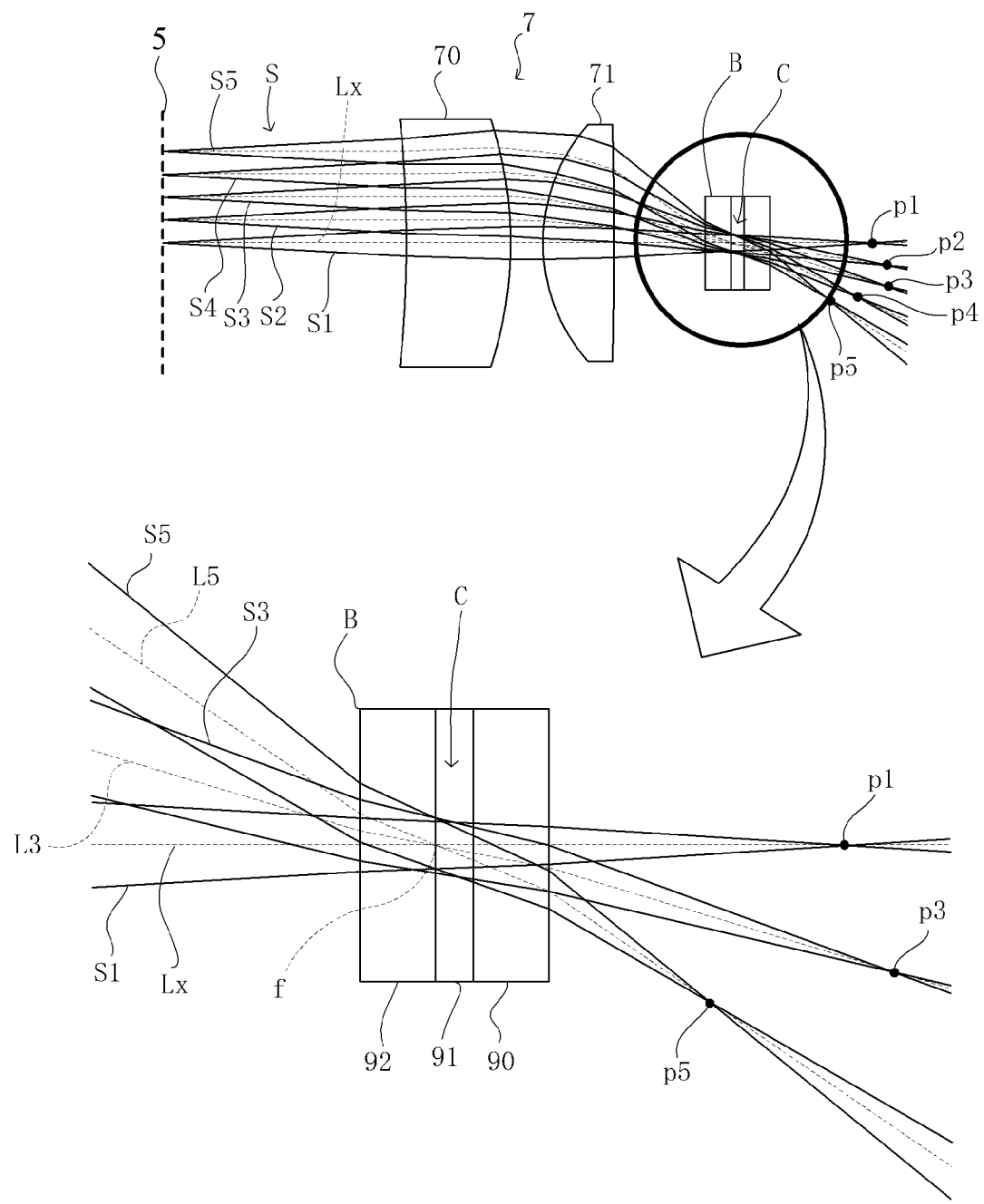
FIG. 2 includes schematic diagrams illustrating an optical path formed by an objective lens of the hologram recording apparatus illustrated in FIG. 1.

Hereunder, embodiments of the present invention will be described in details referring to the accompanying drawings. FIGS. 1 and 2 illustrate an embodiment of a hologram recording apparatus and an objective lens.

As illustrated in FIG. 1, the hologram recording apparatus A emits a recording reference beam Rs to a hologram recording medium B while condensing an recording beam S thereon to thereby record a hologram on a unit recording area X, and emits to the hologram recording medium B, in a reconstruction process, a reconstructing reference beam Rp which is a phase-conjugate beam with respect to the recording reference beam Rs, and receives a reconstruction beam P from the unit recording area X to thereby reconstruct the hologram.

The hologram recording apparatus A includes a light source 1, a collimator lens 2, a beam splitter 3, a recording zoom lens 4, a spatial light modulator 5, a half mirror 6, an objective lens 7 according to the present invention, a first reflector 8, a reference zoom lens 9, a galvanomirror 10 for recording, a second reflector 11, a galvanomirror 12 for reconstruction, and an imaging device 20 for reconstruction. The light source 1, the collimator lens 2, the beam splitter 3, the first reflector 8, the reference zoom lens 9, and the recording galvanomirror 10 constitute a recording reference beam emitter that emits a recording reference beam Rs so as to cause interference with the recording beam S, when emitting the recording beam S to the hologram recording medium B through the objective lens 7. The light source 1, the collimator lens 2, the beam splitter 3, the first reflector 8, the reference zoom lens 9, the second reflector 11, and the reconstruction galvanomirror 12 constitute a reconstructing reference beam emitter that emits a reconstructing reference beam Rp, being a phase-conjugate beam with respect to the recording reference beam Rs, to the hologram recording medium B. The half mirror 6 and the imaging device 20 constitute a reconstruction beam receiver that receives through the objective lens 7 a reconstruction beam P from the hologram recording medium B, generated in an opposite direction to the recording beam S by the emission of the reconstructing reference beam Rp.

The hologram recording medium B includes a recording layer 91 interposed between a pair of light-transmissive cover layers 90, so that the recording layer 91 can receive light from both directions. On the recording layer 91, a unit recording area X is formed through the interference between the recording beam S and the recording reference beam Rs, so that the hologram is recorded on each of such unit recording areas. In the reconstruction process, the reconstructing reference beam Rp is emitted to the unit recording area X in an opposite direction to the recording reference beam Rs as indicated by a broken line, and a diffracted beam is generated through the interference of the reconstructing reference beam Rp against the hologram. Such diffracted beam is transmitted through the objective lens 7 in the opposite direction to the recording beam S, and received by the imaging device 20 as the reconstruction beam P.

The light source 1 is constituted of a semiconductor laser device for example, and emits a highly interferential laser beam of a relatively narrow band. The collimator lens 2 converts the laser beam emitted by the light source 1 into parallel light. The parallel light outputted from the collimator lens 2 is split by the beam splitter 3 into the recording beam S and the reference beam R. The recording beam S has its diameter expanded by the recording zoom lens 4, and then enters the spatial light modulator 5. The reference beam R is emitted to the hologram recording medium B as the recording reference beam Rs in the recording process, through the first reflector 8, the reference zoom lens 9, and the recording galvanomirror 10, in this order. The reference beam R is also emitted to the hologram recording medium B as the reconstructing reference beam Rp in the reconstruction process, through the first reflector 8, the reference zoom lens 9, the second reflector 11, and the reconstruction galvanomirror 12, in this order. The recording reference beam Rs and the reconstructing reference beam Rp are mutually phase-conjugate, and the galvanomirrors 10, 12 respectively corresponding thereto serve to change the incident angle on the hologram recording medium B. With such structure, multiplex recording of a plurality of holograms can be executed on the unit recording area X, according to the incident angle of the recording reference beam Rs and, in the reconstruction process, the plurality of holograms is read out from the unit recording area X, according to the incident angle of the reconstructing reference beam Rp.

The spatial light modulator 5 is constituted, for example, of a transmissive liquid crystal device. The spatial light modulator 5 modulates the recording beam S incident thereon into light representing a pixel pattern according to the information to be recorded. The recording beam S outputted by the spatial light modulator 5 is emitted through the objective lens 7 so as to interfere with the recording reference beam Rs on the recording layer 91 of the hologram recording medium B. As a result, the unit recording area X is formed on the recording layer 91, as the region where the hologram has been recorded. In the reconstruction process, the reconstructing reference beam Rp interferes with the hologram recorded on the unit recording area X, to thereby generate the diffracted beam which serves as the reconstruction beam P, and the reconstruction beam P passes through the objective lens 7 in the opposite direction to the recording beam S and is reflected by the half mirror 6. Thus, the reconstruction beam P is received by the imaging device 20 for reconstruction, so that the hologram recorded on the unit recording area X is read out.

The objective lens 7 is constituted, as illustrated in FIG. 2 as an example, of a combination of a first lens 70 on the entrance side of the recording beam S, and a second lens 71 on the exit side thereof. The first lens 70 is a convex meniscus lens, and the second lens 71 is a generally plano-convex lens 72. On the objective lens 7 thus configured, the recording beam S outputted from the spatial light modulator 5 is incident in a form of a parallel beam flux. The distance between the spatial light modulator 5 and the objective lens 7 corresponds to the front focal length of the objective lens 7. The parallel beam flux of the recording beam S includes an on-axis beam flux S1, the principal ray of which coincides with the optical axis Lx of the objective lens 7, and a plurality of off-axis beam fluxes S2 to S5 each deviated from the optical axis Lx by a different distance. The on-axis beam flux S1 and the off-axis beam fluxes S2 to S5 are condensed by the objective lens 7 so as to form a beam waist C on the recording layer 91. Also, the on-axis beam flux S1 is converged to an on-axis image point p1 on the opposite side of the objective lens 7 across the hologram recording medium B, while the off-axis beam fluxes S2 to S5 are converged to off-axis image points p2 to p5, respectively. In particular, the off-axis beam flux S5 refracted by the objective lens 7 so as to define a largest field angle is converged to the off-axis image point p5 which is closest to the hologram recording medium B. The unit recording area X is thus formed in the region of the recording layer 91 where the beam waist C is formed.

With the objective lens 7, in the process that the off-axis beam fluxes S2 to S5 reach the recording layer 91 of the hologram recording medium B through the cover layer 90, the angle of these beam fluxes with respect to the optical axis Lx is changed according to the refractive index of the cover layer 90. In the case of the off-axis beam flux S5 which defines the largest field angle among the plurality of off-axis beam fluxes S2 to S5, the off-axis image point p5 is formed at the position closest to the hologram recording medium B. In other words, the objective lens 7 has such an optical characteristic as emitting the off-axis beam flux S5 of the largest field angle to the hologram recording medium B at the largest incident angle, and intensely converging the off-axis beam flux S5. Accordingly, on-axis focal points f, which fall on the intersection of the principal rays L3, L5 of the off-axis beam fluxes S3, S5 and the optical axis Lx, are barely shifted from each other. Consequently, the beam waist C formed in the vicinity of the on-axis focal points f is formed in the recording layer 91 in a relatively small size.

The characteristic of the objective lens 7 will now be described, through comparison with a conventional example.

Figure 3:
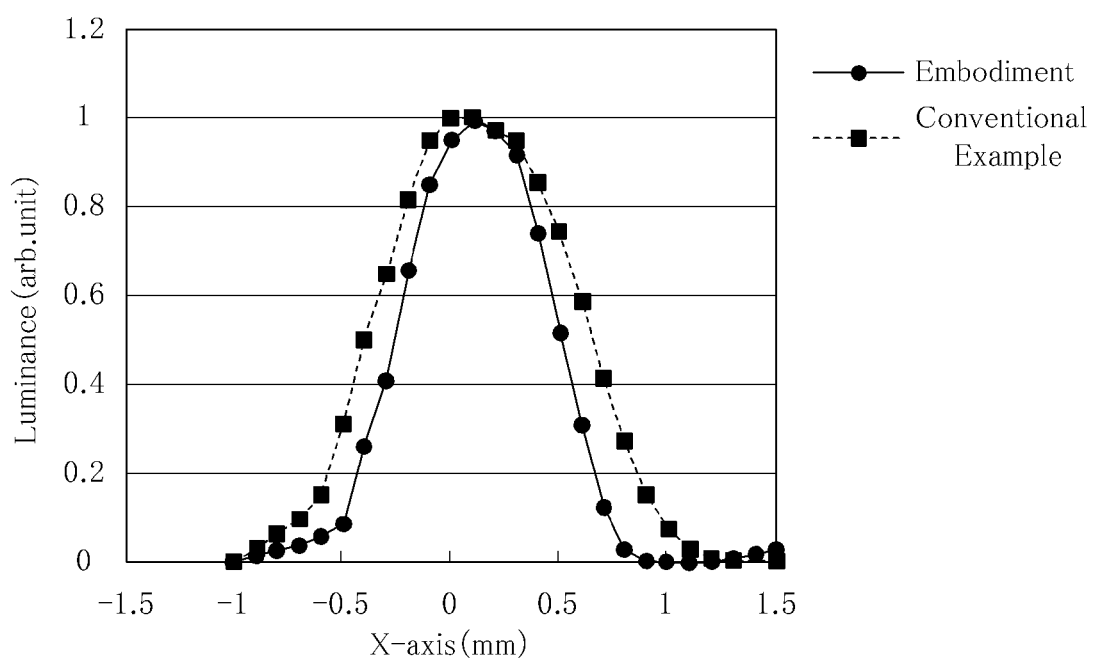
FIG. 3 is a graph for explaining comparison between the present embodiment and a conventional example.
Figure 6:
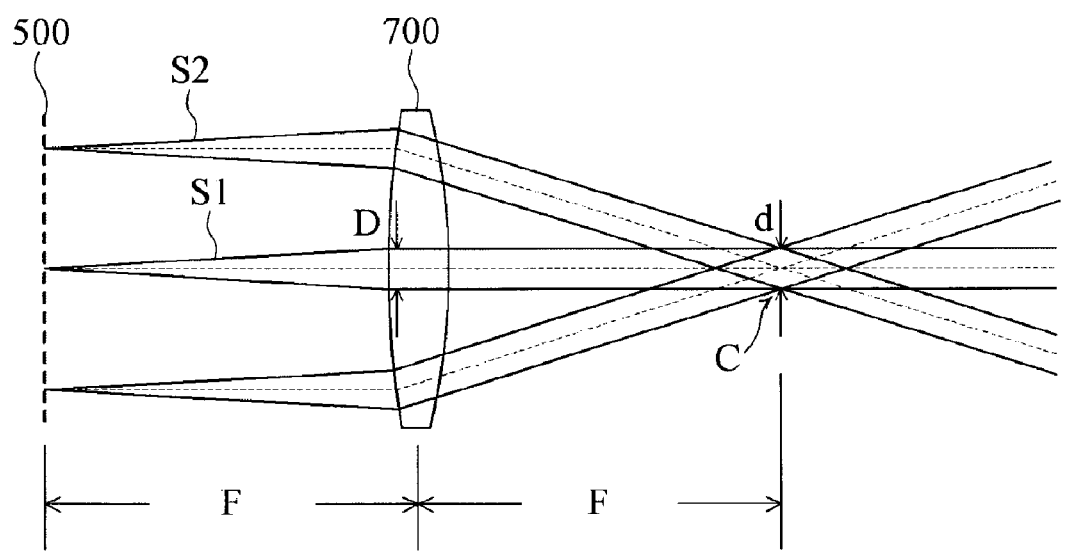
FIG. 6 is a schematic diagram illustrating an optical path formed by an objective lens of a conventional hologram recording apparatus.
Figure 7:
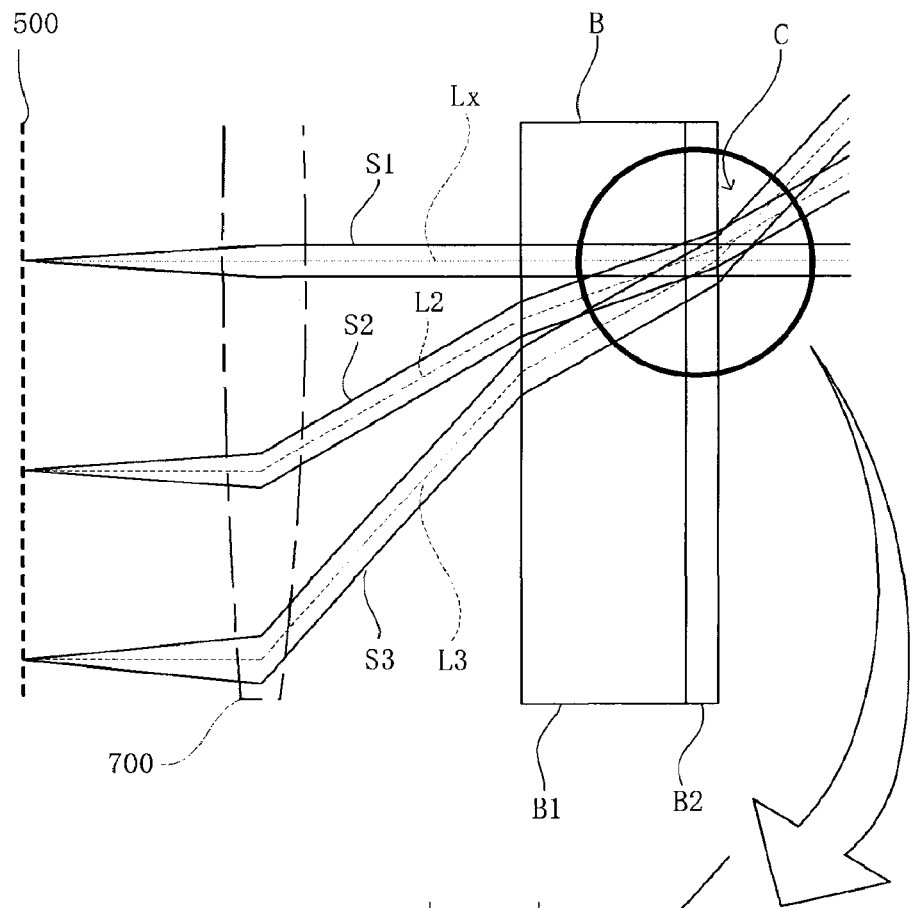
FIG. 7 includes schematic diagrams illustrating details of the optical path formed by the objective lens illustrated in FIG. 6.
Figure 7:
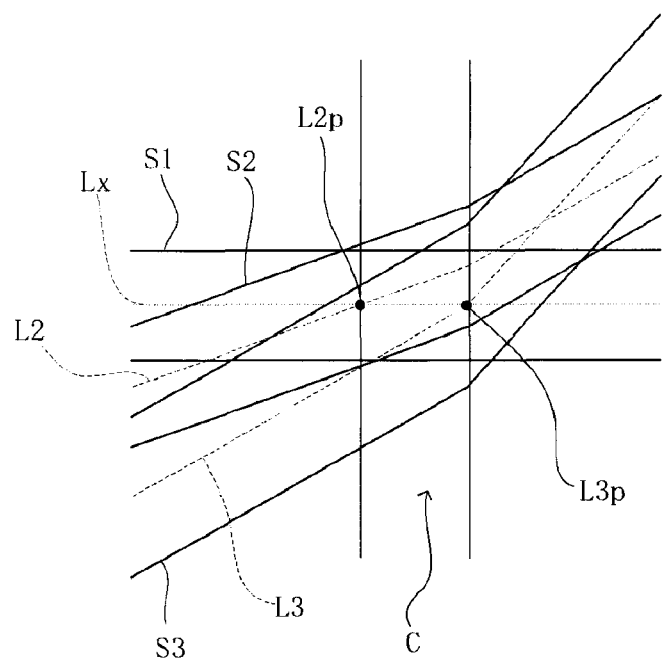

FIG. 3 illustrates the luminance of the unit recording area X in the X-axis direction, measured after forming the unit recording area X of the hologram with the beam waist C. The luminance of the conventional example comes from the objective lens 700 in the telecentric system illustrated in FIG. 6. As illustrated in FIG. 3, the objective lens 7 according to the embodiment presents a narrower luminance distribution in the region corresponding to the unit recording area X, than the conventional objective lens 700. This means that the beam waist C is smaller than that formed by the conventional example.

Also, with the objective lens 7 according to the embodiment, the off-axis beam flux S5 with the largest field angle is more intensely converged than the other off-axis beam fluxes S2 to p4, and hence the flux density of the off-axis beam flux S5 with the largest field angle becomes relatively high at the position where the beam waist C is formed. Such configuration also provides, therefore, a synergistic effect that the hologram is recorded with uniform light intensity as a whole in the unit recording area X defined by the beam waist C, and in the reconstruction process the reconstruction beam P of sufficient light intensity can be provided from a central portion of the unit recording area X to a peripheral portion thereof.

Figure 4:
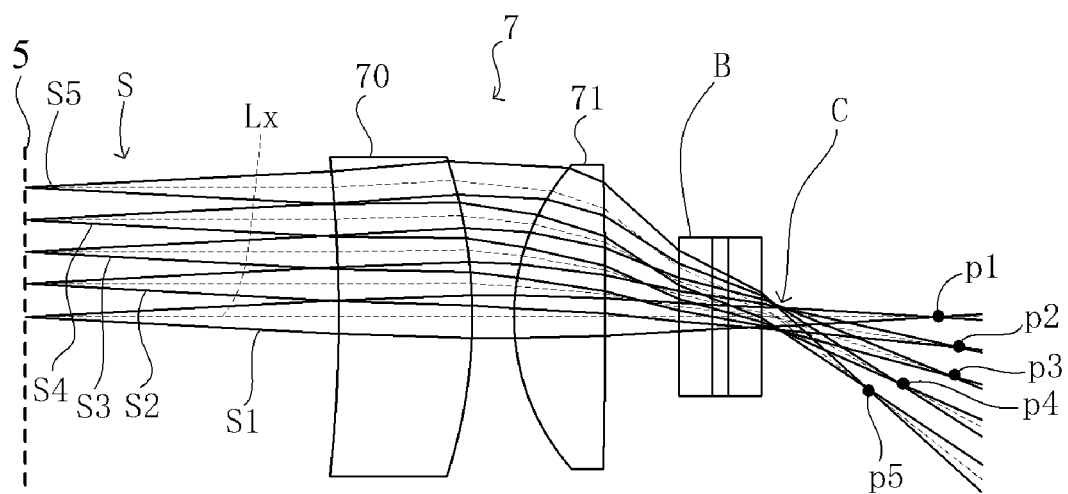
FIG. 4 is a schematic diagram illustrating a referential optical path formed by the objective lens according to the embodiment.
Figure 5:
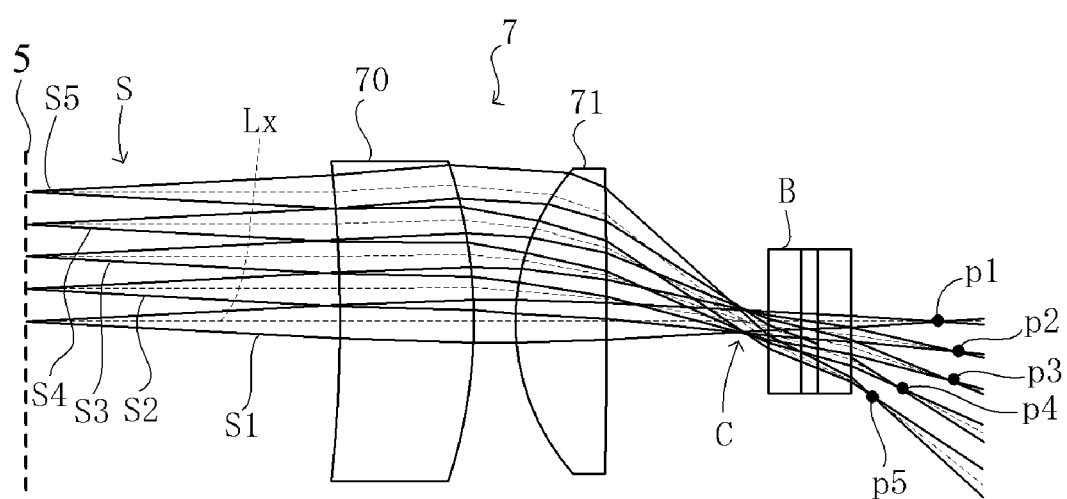
FIG. 5 is a schematic diagram illustrating another referential optical path formed by the objective lens according to the embodiment.

As a reference, FIGS. 4 and 5 illustrate the case where the hologram recording medium B is located with respect to the objective lens 7 such that the beam waist C of the recording beam S deviates from the hologram recording medium B. As illustrated in these drawings, even though the beam waist C is formed outside the hologram recording medium B, the off-axis image point p5 of the off-axis beam flux S5 with the largest field angle is formed on a position closer to the hologram recording medium B, than all the other off-axis image points p2 to p4 of the off-axis beam fluxes S2 to p4. Employing the objective lens 7 thus configured enables significantly reducing the size of the beam waist C of the recording beam S.

Consequently, the objective lens 7 according to the embodiment allows significantly slimming the beam waist thereby reducing the size of a unit area for hologram recording, and thus increasing recording density of the hologram.

It is to be understood that the present invention is not limited to the foregoing embodiments.

The structure of the embodiments above is merely exemplary, and the design thereof may be modified in accordance with specifications.

The invention claimed is:

1. An objective lens for recording a hologram that condenses a recording beam on a hologram recording medium;
   wherein the objective lens is configured to condense, upon receipt of the recording beam in a form of a parallel beam flux, an on-axis beam flux and an off-axis beam flux contained in the parallel beam flux so as to form a beam waist in the hologram recording medium, and such that a distance between the hologram recording medium and an off-axis image point of a portion of the off-axis beam flux that defines a largest field angle, among all portions of the off-axis beam flux gradually converging ahead of the beam waist, becomes minimal.

2. The objective lens according to claim 1, comprising a first lens on an entrance side of the recording beam and a second lens on an exit side thereof, combined as a set.

3. A hologram recording apparatus that includes an objective lens for recording a hologram that condenses a recording beam on a hologram recording medium,
   wherein the objective lens is configured to condense, upon receipt of the recording beam in a form of a parallel beam flux, an on-axis beam flux and an off-axis beam flux contained in the parallel beam flux so as to form a beam waist in the hologram recording medium, and such that a distance between the hologram recording medium and an off-axis image point of a portion of the off-axis beam flux that defines a largest field angle, among all portions of the off-axis beam flux gradually converging ahead of the beam waist, becomes minimal.

4. The hologram recording apparatus according to claim 3, comprising:
   a recording reference beam emitter that emits a recording reference beam so as to cause interference with the beam waist of the recording beam, when emitting the recording beam to the hologram recording medium through the objective lens;
   a reconstructing reference beam emitter that emits a reconstructing reference beam, being a phase-conjugate beam with respect to the recording reference beam, to the hologram recording medium; and
   a reconstruction beam receiver that receives through the objective lens a reconstruction beam from the hologram recording medium, generated in an opposite direction to the recording beam by the emission of the reconstructing reference beam.

\* \* \* \* \*